United States Patent Office 2,809,578
Patented Oct. 15, 1957

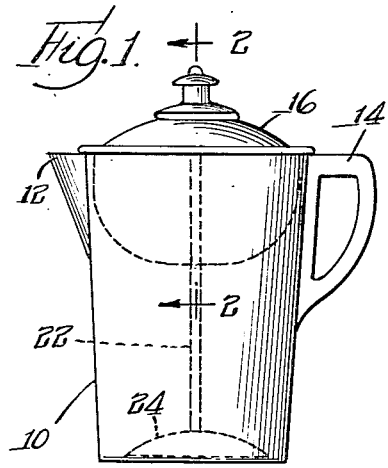
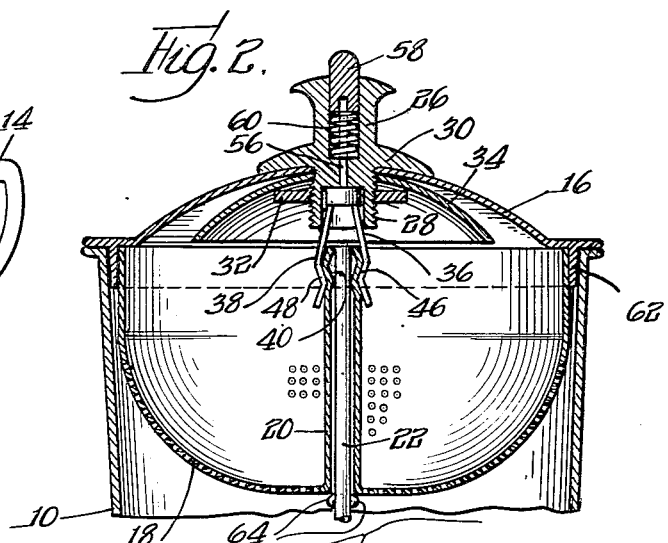
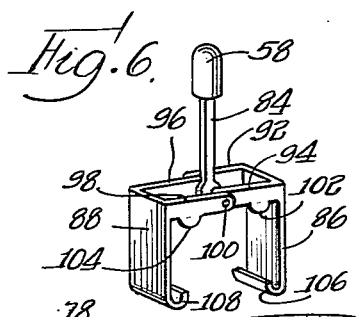
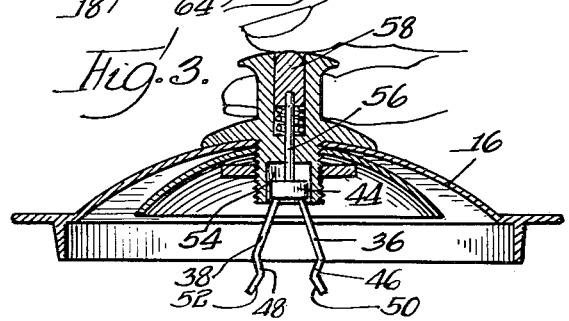
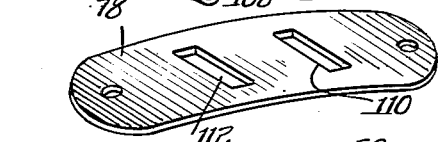
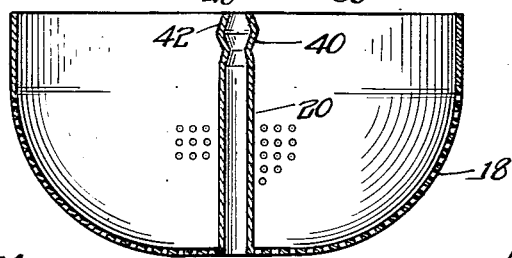
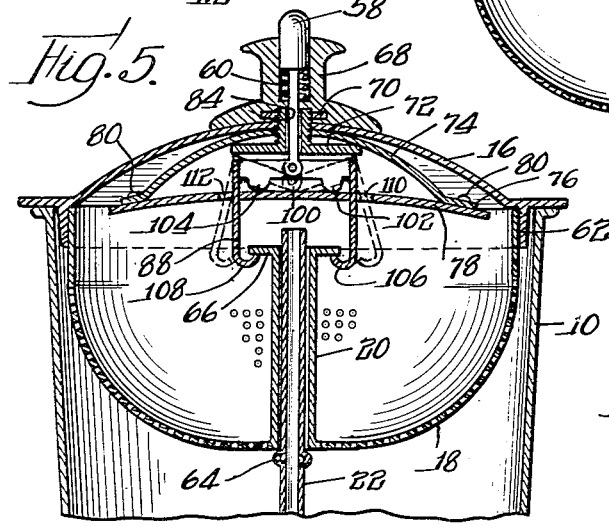
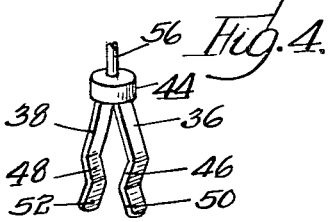
INVENTOR.
D. Scott Campbell
BY
Karl H. Sommermeyer
Atty

2,809,578

COFFEE BASKET LIFTER

Date Scott Campbell, Elgin, Ill., assignor to McGraw-Edison Company, a corporation of Delaware Application November 2, 1953, Serial No. 389,650

5 Claims. (Cl. 99—312)

The present invention relates to a novel beverage brewing apparatus, and more particularly to a novel apparatus for brewing beverages such as coffee.

In coffee brewing apparatus heretofore known, and particularly apparatus of the percolator type, a basket or holder for coffee grounds is provided for assembly within a coffee pot. Many occasions arise when it is desirable either to assemble the coffee basket within or remove the basket from the coffee pot when the pot is heated so that there is danger of burning the hand during such assembly or removal. It is, therefore, an object of the present invention to provide a novel apparatus of the type described, whereby the coffee basket or holder may be either assembled with or removed from the coffee pot without necessity for touching the basket with the hand.

Another object of the present invention is to provide a novel apparatus of the above described type, wherein the coffee basket or holder may be connected with the coffee pot closure or cover so that the basket and cover may be assembled with or removed from a coffee pot as a unit.

Another object of the present invention is to provide novel, simple, and inexpensive means for detachably connecting a closure and a coffee basket together as a unit.

Still another object of the present invention is to provide an apparatus of the above described type, wherein the closure or cover and the coffee basket may be easily and quickly connected together as a unit and quickly disconnected without any necessity for touching the coffee basket.

While the present invention will be described with particular reference to its usefulness in coffee brewing apparatus, it will be apparent that the principles of this invention may be applied to various brewing devices, which include a closure for a receptacle and a holder or basket for one of the brewing ingredients, and, therefore, other objects and advantages of the present invention will become apparent from the following description and the accompanying drawings, wherein:

Fig. 1 is a side elevational view of a brewing apparatus embodying the principles of this invention;

Fig. 2 is an enlarged fragmentary vertical cross sectional view taken along line 2—2 in Fig. 1;

Fig. 3 is an exploded cross sectional view similar to Fig. 2 and showing the novel closure and coffee basket or holder of this invention;

Fig. 4 is an enlarged perspective view, showing an element of this invention;

Fig. 5 is a cross sectional view similar to Fig. 2, but showing a modified form of the invention; and Fig. 6 is a perspective view, showing elements of the modified form of this invention.

Referring now more specifically to the drawings, wherein like parts are designated by the same numerals throughout the various figures, a brewing apparatus embodying the principles of this invention is shown in Fig. 1 and includes a liquid receptacle 10 having a spout 12 and a handle 14. A closure or cover 16 is provided and is adapted to rest on the upper edge of the container 10. A pervious basket or holder 18 for coffee grounds or the like is removably disposed within the container and is detachably connected with the closure by means described hereinbelow. The basket or holder is provided with a centrally located upstanding tube 20 for receiving the upper end of a smaller tube 22. The lower end of the smaller tube is connected with an inverted cup-shaped member 24, which cup-shaped member rests on the bottom of the container 10 in the usual manner.

The closure 16 is provided with a centrally located handle 26 which is preferably formed from a heat insulating material, such as Bakelite. The handle 26 includes an integral depending threaded shaft 28 which extends through a suitable aperture in the closure 16. A flange 30 extends radially from the handle and conforms generally with the surface of the closure for properly positioning the handle on the closure. A suitable nut 32 is threaded on the lower end of the shaft 28 for retaining the handle in assembled relationship with the closure. If desired, a dome-shaped baffle 34 may be disposed between the closure 16 and the nut 32 for a purpose described hereinbelow.

In accordance with a feature of this invention, means is provided for connecting the closure 16 and the holder or basket 18 together so that these members may be assembled with or removed from the container 10 as a unit. In the embodiment shown in Figs. 2, 3, and 4, this means includes a pair of resilient fingers 36 and 38 carried by the closure, which fingers are adapted to grip the upper end of the hollow tube 20 on the basket. The upper end of the tube 20 is formed inwardly to provide a shoulder-like portion 40 for engagement with the fingers, and, in addition, the extremity of the tube is tapered inwardly, as at 42, to provide a cam or guiding surface for facilitating the application of the fingers onto the end of the tube.

As shown best in Fig. 4, the fingers 36 and 38 are connected at their upper ends to a piston-like member 44 and diverge downwardly therefrom. Intermediate portions of the fingers are bent inwardly to provide shoulder engaging hooks 46 and 48, and the lower free ends of the fingers are bent outwardly, as at 50 and 52, to provide cam surfaces for guiding the fingers over the end of the tube 20.

The member 44 is mounted for reciprocating movement in a bore 54 in the lower end of the shaft 28 of the handle. The member 44 is suitably connected with and carried by a rod 56, which rod extends through a suitable aperture in the handle and is connected at its upper end to a push button 58. The push button 58 is slidably mounted within a bore in the upper end of the handle and is normally urged to its upper position shown in Fig. 2 by a compression spring 60. With the parts in the position shown in Fig. 2, it is seen that the member 44 and the fingers 36 and 38 are drawn into the bore 54 in the lower end of the handle. It should be noted that the diameter of this bore is such that the walls of the bore engage the fingers 36 and 38 and compress them together so that the hook portions 46 and 48 thereof securely interlock with the shoulder 40 on the basket tube 20. The fingers 36 and 38 are formed from a suitable resilient material, preferably spring steel, so that as the push button is compressed, as shown in Fig. 3, the fingers move downwardly out of the bore 54 and flex outwardly to the normal diverging position illustrated. In this normal diverging position, the hook portions 46 and 48 of the fingers are spread apart far enough to release the basket.

When utilizing the above described apparatus for brewing a beverage, such as coffee, the container 10 is filled with water, and the basket or holder is filled with coffee grounds in the usual manner. If the container is preheated, it is desirable to assemble the basket 18 with the closure so that the basket and closure 16 may be positioned on the container as a unit. In order to connect the closure with the basket, it is merely necessary to align the spring fingers 36 and 38 with the tube 20 and then move the parts together so that the cam surfaces 42, 50, and 52 cause the spring fingers to flex apart until the hook portions 46 and 48 engage with the shoulder 40 on the basket stem. It should be noted that the closure 16 is preferably provided with an annular depending flange 62 which snugly receives the basket 18 as illustrated. This flange prevents the basket from tilting relative to the closure and prevents the basket from inadvertently disengaging with the gripping fingers. This flange also serves to center the closure with respect to the container 10.

The assembled closure and basket unit is positioned on the container 10, as shown in Figs. 1 and 2, with the tube 22 extending through the tube 20 of the basket. As the temperature within the container is raised, the water is forced upwardly through the tube 22 so that the water spills out into the basket and percolates back down through the coffee. During the brewing of the coffee, there is usually a tendency for the water to bubble and splash as it emerges from the tube 22, and such splashing water will be directed downwardly and toward the outer portions of the basket by the baffle 34. After the brewing operation is completed, the closure 16 and the basket 18 may be removed from the container as a unit and carried to a point where it is desired to deposit the basket with the used coffee grounds. In order to separate the closure and the basket, it is merely necessary to press on the push button 58, as illustrated in Fig. 3, whereupon the resilient spring fingers 36 and 38 spread apart to release the basket. It may sometimes be desirable either to place the basket within the coffee container 10 without utilizing the cover or closure, or to remove the cover without removing the basket. Therefore, it is necessary to provide means for preventing the basket or holder 18 from falling to the bottom of the container, and such means may take the form of protuberances 64 on the tube 22 for engaging the bottom of the basket.

Figs. 5 and 6 illustrate an apparatus embodying a modified form of the present invention. In this embodiment, the container 10, closure 16, and the basket or holder 18 are substantially identical to the similar elements described above. However, in this embodiment, the upper end of the basket tube 20 is preferably formed with a flange 66 for engaging the modified gripping means carried by the closure.

In the embodiment shown in Figs. 5 and 6, the closure is provided with a suitable heat insulating handle 68 having a nut element 70 imbedded therein. A hollow screw-like member 72 threadedly engages the nut for retaining the handle on the closure 16. A dome-shaped baffle 74 is provided which is substantially similar to the above described baffle 34, except that a marginal flange 76 is provided for mounting a plate member 78. The plate member may be secured to the flange 76 in any suitable manner, such as by rivets 80.

The embodiment of Figs. 5 and 6 also includes a push button 58 slidably mounted within the handle, which push button is normally biased upwardly by the spring 60. However, in this form, the push button 58 is connected to a rod 84 which is pivotally connected to gripping members 86 and 88.

As shown best in Fig. 6, the gripping members 86 and 88 are generally L-shaped and include pairs of spaced arms 92—94 and 96—98, respectively. The free ends of the arms 92 and 94 are pivotally interconnected with the free ends of the arms 96 and 98 and also with the lower end of the actuating rod 84 by a suitable pin 100. These arms are provided intermediate their ends with fulcrum members 102 and 104 for the purpose described below. The lower ends of the arms terminate in hooks 106 and 108, respectively, for interengaging with the shoulder provided by flange 66 on the basket tube. As shown best in Fig. 5, the lower ends of the gripping members 86 and 88 extend downwardly through openings 110 and 112 in the plate member 78 for engagement with the basket. It should be noted that the plate 78 is formed so that it engages the fulcrums 102 and 104 of the gripping members so that upon downward movement of the push button 58, the gripping members assume the position shown in dotted lines in Fig. 5 and thus release the basket or holder 18. It is understood, of course, that when the push button is released, the gripping members assume the position shown in solid lines for interengagement with the shoulder provided by the flange 66 to connect the closure and the basket together.

The embodiment shown in Figs. 5 and 6 may be utilized in substantially the same manner as described above for the form of the invention shown in Figs. 1 through 4. It, therefore, suffices to say that the form of the invention shown in Figs. 5 and 6 provides means whereby the closure and the basket may be quickly connected together or disconnected whenever desired.

From the above description, it is seen that the present invention has provided novel apparatus, whereby the basket or holder may be placed within or removed from the brewing container without any need for directly touching the basket with the hand. In addition, it is seen that this invention has provided simple means which may be economically manufactured for quickly and substantially instantaneously either connecting or disconnecting the closure and basket.

While the preferred embodiments of the present invention have been shown and described herein, it is obvious that the principles of this invention may be applied to other brewing devices and that various changes may be made in the disclosed structures without departing from the spirit and scope of the appended claims.

I claim:

1. In an apparatus, a closure for a container, said closure having radially projecting annular marginal flange means engageable with an upper margin of a container and a depending generally annular flange adjacent the margin thereof for projecting within the container, a holder for a brewing ingredient, said holder having upper margin means for snugly telescopically associating with said depending annular flange to prevent relative tilting between said closure and said holder when said flange and said upper margin means are telescopically associated, said holder including a centrally located upstanding member fixed therewith and having an upper end portion disposed adjacent a plane containing said upper margin means, a plurality of gripping fingers carried by and generally centrally of said closure and adapted to grip said upstanding member to connect the closure and holder together as a unit, centrally located handle means on and secured to said closure, and push button means projecting axially through said handle means and said closure and operatively interconnected with said gripping fingers for actuating said gripping fingers to connect and disconnect said closure and holder.

2. An apparatus comprising a closure member for a container, an ingredient holder member adapted to be removably disposed within the container, said holder member including a central upstanding member having its lower end fixed to a bottom of the holder member and having generally radially projecting annular shoulder means adjacent its upper end, a pair of opposed finger means centrally carried by said closure member and depending therefrom and having lower end portions engageable with said shoulder means for detachably connecting said closure and holder members together as a unit, a handle member centrally disposed on and fixed with respect to said closure member, generally vertically reciprocable push button means slidably disposed in said handle member and extending generally axially through said closure member and connected with said finger means for shifting said finger means, resilient means yieldably biasing said push button means upwardly, and fixed means carried by said closure member and engageable with said finger means for urging lower end portions of the finger means toward each other for engaging said shoulder means when the push button means is in a raised position and for enabling said finger means to spread apart and release said shoulder means when said push button means is depressed.

3. An apparatus, as defined in claim 2, wherein said finger means includes a pair of resilient spring elements secured to said push button means in normally diverging relationship and vertically reciprocable with said push button means, and wherein said fixed means comprises a hollow sleeve depending from said handle means for partially surrounding said spring elements.

4. An apparatus, as defined in claim 2, wherein said finger means have upper end portions pivotally connected to said push button means and include portions projecting laterally from the pivotal connection and additional generally axially extending portions for engaging said shoulder means, and wherein said fixed means includes a transverse member underlying and engageable with said laterally extending finger means portions.

5. An apparatus, comprising a closure member for a container, an ingredient holder member adapted to be removably disposed within the container, said holder member including a central upstanding tube having its lower end fixed to an apertured bottom of the holder member and having generally radially projecting annular shoulder means adjacent its upper end, handle means centrally disposed on and fixed with respect to said closure member and including a grip portion projecting above the closure member and an attachment portion extending through and beneath the closure member, a generally domed shaped baffle carried by said attachment portion for deflecting any liquid rising through said tube and spreading such liquid over said holder member, generally vertically reciprocable push button means slidably disposed in said handle member and extending generally axially through said closure member, a pair of generally opposed finger means connected with said push button means and depending therefrom for engaging said shoulder means for detachably connecting the closure and holder members together as a unit, and fixed means carried by the closure member and engageable with said finger means for urging lower end portions of the finger means toward each other for engaging said shoulder means when the push button means is in a raised position and for enabling said finger means to spread apart and release said shoulder means when the push button means is depressed.

References Cited in the file of this patent
UNITED STATES PATENTS

| | | |
|---|---|---|
| 441,721 | Trumbore | Dec. 2, 1890 |
| 823,670 | Denison | June 19, 1906 |
| 1,283,034 | Baeck | Oct. 29, 1918 |
| 1,424,774 | Pearl | Aug. 8, 1922 |
| 1,728,572 | Pearson | Sept. 17, 1929 |
| 1,802,268 | Onofrio | Apr. 21, 1931 |
| 2,011,102 | Fisher et al. | Aug. 13, 1935 |
| 2,020,859 | Spalding | Nov. 12, 1935 |
| 2,109,363 | Williams | Feb. 22, 1938 |
| 2,346,924 | Lehmann | Apr. 18, 1944 |
| 2,407,331 | Van Velzer | Sept. 10, 1946 |
| 2,628,553 | Titus | Feb. 17, 1953 |